DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 6, 1975

934 OG 10

T934,013

POLYETHYLENE TEREPHTHALATE FILM-METAL LAMINATE

Carl John Heffelfinger, Circleville, Ohio, assignor to E. I. du Pont de Nemours and Company, Wilmington, Del.

Continuation of abandoned application Ser. No. 342,422, Mar. 19, 1973. This application July 31, 1974, Ser. No. 493,738

Int. Cl. B32b *15/08*

U.S. Cl. 428—458

No Drawing. 5 Pages Specification

A laminated structure of a metal layer, e.g., copper, aluminum or silver, and a layer of unoriented, crystalline polyethylene terephthalate having an intrinsic viscosity of at least about 0.7 (preferably between 0.85 and 1) and a degree of crystallinity of at least about 20% (preferably 25 to 65%).